United States Patent
Dabrowski et al.

(10) Patent No.: US 11,139,589 B2
(45) Date of Patent: Oct. 5, 2021

(54) POLARIZATION UNIQUENESS MANIPULATION APPARATUS (PUMA)

(71) Applicant: The Boeing Company, Chicago, IL (US)

(72) Inventors: Ted R. Dabrowski, Madison, AL (US); Robert A. Smith, Owens Crossroads, AL (US)

(73) Assignee: The Boeing Company, Chicago, IL (US)

(*) Notice: Subject to any disclaimer, the term of this patent is extended or adjusted under 35 U.S.C. 154(b) by 250 days.

(21) Appl. No.: 16/171,150

(22) Filed: Oct. 25, 2018

(65) Prior Publication Data
US 2020/0136271 A1 Apr. 30, 2020

(51) Int. Cl.
| | | |
|---|---|---|
| H01Q 21/24 | (2006.01) | |
| H04B 7/10 | (2017.01) | |
| G06K 7/10 | (2006.01) | |
| H01Q 9/04 | (2006.01) | |
| H01Q 21/28 | (2006.01) | |
| H01Q 25/00 | (2006.01) | |

(52) U.S. Cl.
CPC ........... H01Q 21/245 (2013.01); H01Q 21/24 (2013.01); H04B 7/10 (2013.01); *G06K 7/10316* (2013.01); *H01Q 9/0407* (2013.01); *H01Q 21/28* (2013.01); *H01Q 25/00* (2013.01); *H01Q 25/001* (2013.01)

(58) Field of Classification Search
CPC ...... H01Q 21/245; H01Q 21/24; H01Q 21/28; H01Q 9/0407; H01Q 25/00; H01Q 25/001; G06K 7/10316; H04B 7/10

USPC .................................................. 342/361, 359
See application file for complete search history.

(56) References Cited

U.S. PATENT DOCUMENTS

| | | | | |
|---|---|---|---|---|
| RE28,546 E | * | 9/1975 | Foldes | .................. H01Q 25/04 370/206 |
| 4,771,288 A | * | 9/1988 | Johnson | .................. G01S 7/024 342/147 |
| 6,411,824 B1 | * | 6/2002 | Eidson | ..................... H04B 7/10 342/361 |

(Continued)

OTHER PUBLICATIONS

Chen et al.; "A Novel Dual-Antenna Structure for UHF RFID Tags"; IEEE Transactions on Anennas and Propagation, vol. 59, No. 11, Nov. 2011; pp. 3950-3960.

*Primary Examiner* — Chuong P Nguyen
(74) *Attorney, Agent, or Firm* — Haynes and Boone, LLP

(57) ABSTRACT

Systems, methods, and apparatus for a polarization uniqueness manipulation apparatus (PUMA) are disclosed. In one or more embodiments, an antenna apparatus (e.g., a PUMA) comprises a receive antenna to receive a signal with a first polarization. In one or more embodiments, the antenna apparatus is configured to passively modify the first polarization of the signal to a second polarization. The antenna apparatus further comprises a transmit antenna to transmit the signal with the second polarization. In at least one embodiment, the receive antenna is communicatively coupled to the transmit antenna. In one or more embodiments, the receive antenna and the transmit antenna are each separate patch antennas that are mounted on a substrate of the antenna apparatus at different orientations from one another. In at least one embodiment, the second polarization is dependent upon the different orientations of the receive antenna and the transmit antenna.

20 Claims, 11 Drawing Sheets

(56) References Cited

U.S. PATENT DOCUMENTS

| | | | | |
|---|---|---|---|---|
| 6,518,929 B1* | 2/2003 | Gilmore | ............... | H01Q 1/2275 |
| | | | | 343/725 |
| 6,697,641 B1* | 2/2004 | Shapira | ................. | H01Q 1/246 |
| | | | | 455/562.1 |
| 6,980,166 B2* | 12/2005 | Gilmore | ............... | H01Q 1/2275 |
| | | | | 343/725 |
| 7,072,611 B2* | 7/2006 | Shapira | ................. | H01Q 1/246 |
| | | | | 455/7 |
| 7,253,779 B2* | 8/2007 | Greer | ...................... | H01Q 7/00 |
| | | | | 343/744 |
| 8,354,972 B2* | 1/2013 | Borja | .................... | H01Q 5/378 |
| | | | | 343/797 |
| 8,400,269 B2* | 3/2013 | Tuttle | ................ | G06K 7/10316 |
| | | | | 340/10.1 |
| 8,913,699 B2* | 12/2014 | O'Keeffe | ............. | H01Q 21/245 |
| | | | | 375/346 |
| 9,443,121 B2* | 9/2016 | Duron | ................ | G06K 7/10316 |
| 2008/0042846 A1* | 2/2008 | Jenkins | ................ | H01Q 1/2216 |
| | | | | 340/572.7 |
| 2008/0129634 A1* | 6/2008 | Pera | ...................... | H01Q 21/24 |
| | | | | 343/853 |
| 2009/0058657 A1* | 3/2009 | Tuttle | ................. | G06K 19/0723 |
| | | | | 340/572.7 |
| 2010/0102931 A1* | 4/2010 | Nikitin | ............... | G06K 7/10198 |
| | | | | 340/10.1 |
| 2014/0062665 A1* | 3/2014 | Tuttle | ................ | G06K 7/10316 |
| | | | | 340/10.1 |

* cited by examiner

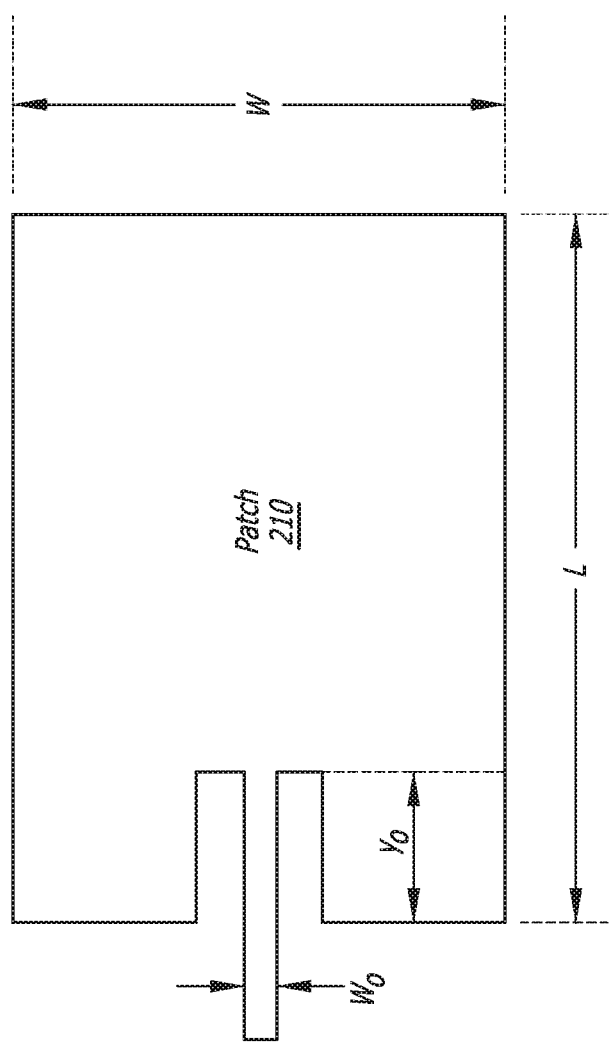

POLARIZATION UNIQUENESS MANIPULATION APPARATUS (PUMA)

FIELD

The present disclosure relates to antennas. In particular, the present disclosure relates to a polarization uniqueness manipulation apparatus (PUMA).

BACKGROUND

In the past years, radio frequency identification (RFID) systems have been widely deployed in inventory systems, logistics, and retail sales. A typical RFID system utilizes a RFID reader and RFID tags. During operation of an RFID system, the RFID reader transmits a radio frequency (RF) signal to interrogate an RFID tag. After the RFID tag receives the signal, the RFID tag sends a response signal, which is received by the RFID reader. Currently, RFID tags often employ active components to generate the information that is to be delivered to the RFID reader. However, these RFID tags are generally large in size, difficult to fabricate, and expensive.

In light of the foregoing, there is a need for an improved technology that may be employed for RFID tags.

SUMMARY

The present disclosure relates to a method, system, and apparatus for a polarization uniqueness manipulation apparatus (PUMA). In one or more embodiments, an antenna apparatus (e.g., a PUMA) comprises a receive antenna to receive a signal with a first polarization. In at least one embodiment, the antenna apparatus is configured to passively modify the first polarization of the signal to a second polarization. The antenna apparatus further comprises a transmit antenna to transmit the signal with the second polarization. In at least one embodiment, the receive antenna is communicatively coupled (e.g., via a feed line) to the transmit antenna.

In one or more embodiments, the signal is an electromagnetic signal (e.g., a radio frequency (RF) signal).

In at least one embodiment, the receive antenna and the transmit antenna are each separate patch antennas. In one or more embodiments, the apparatus further comprises a substrate, and where the patch antennas are mounted on the substrate at different orientations from one another. In one or more embodiments, the second polarization is dependent upon the different orientations. In at least one embodiment, the patch antennas are impedance matched.

In one or more embodiments, the first polarization is orthogonal to the second polarization. In at least one embodiment, one of the first polarization and the second polarization is horizontal polarization, and the other of the first polarization and the second polarization is vertical polarization.

In at least one embodiment, the antenna apparatus is a radio frequency identification (RFID) tag.

In one or more embodiments, a method for operating an antenna apparatus comprises receiving, by a receive antenna of the antenna apparatus, a signal with a first polarization. The method further comprises passively modifying, by the antenna apparatus, the first polarization of the signal to a second polarization. Further, the method comprises transmitting, by a transmit antenna of the antenna apparatus, the signal with the second polarization. In one or more embodiments, the receive antenna is communicatively coupled (e.g., via a feed line) to the transmit antenna.

In at least one embodiment, A reader apparatus comprises a transmit antenna to transmit a signal with a first polarization. The reader apparatus further comprises a receive antenna to receive the signal with a second polarization. Further, the reader apparatus comprises a processor to determine whether the second polarization is different than the first polarization (e.g., orthogonal polarizations), and to process the signal, when the processor determines that the second polarization is different than the first polarization.

In one or more embodiments, the apparatus is a radio frequency identification (RFID) reader.

The features, functions, and advantages can be achieved independently in various embodiments of the present disclosure or may be combined in yet other embodiments.

DRAWINGS

These and other features, aspects, and advantages of the present disclosure will become better understood with regard to the following description, appended claims, and accompanying drawings where:

FIGS. 1A, 1B, and 1C are graphs showing different exemplary types of polarized electric fields.

FIGS. 2A and 2B are diagrams showing different views of the disclosed polarization uniqueness manipulation apparatus (PUMA), in accordance with at least one embodiment of the present disclosure.

FIG. 2A is a diagram showing a side view of the disclosed polarization uniqueness manipulation apparatus (PUMA), in accordance with at least one embodiment of the present disclosure.

FIG. 2B is a diagram showing a top view of the patch antenna of the disclosed polarization uniqueness manipulation apparatus (PUMA) of FIG. 2A, in accordance with at least one embodiment of the present disclosure.

DESCRIPTION

Figure 1A:
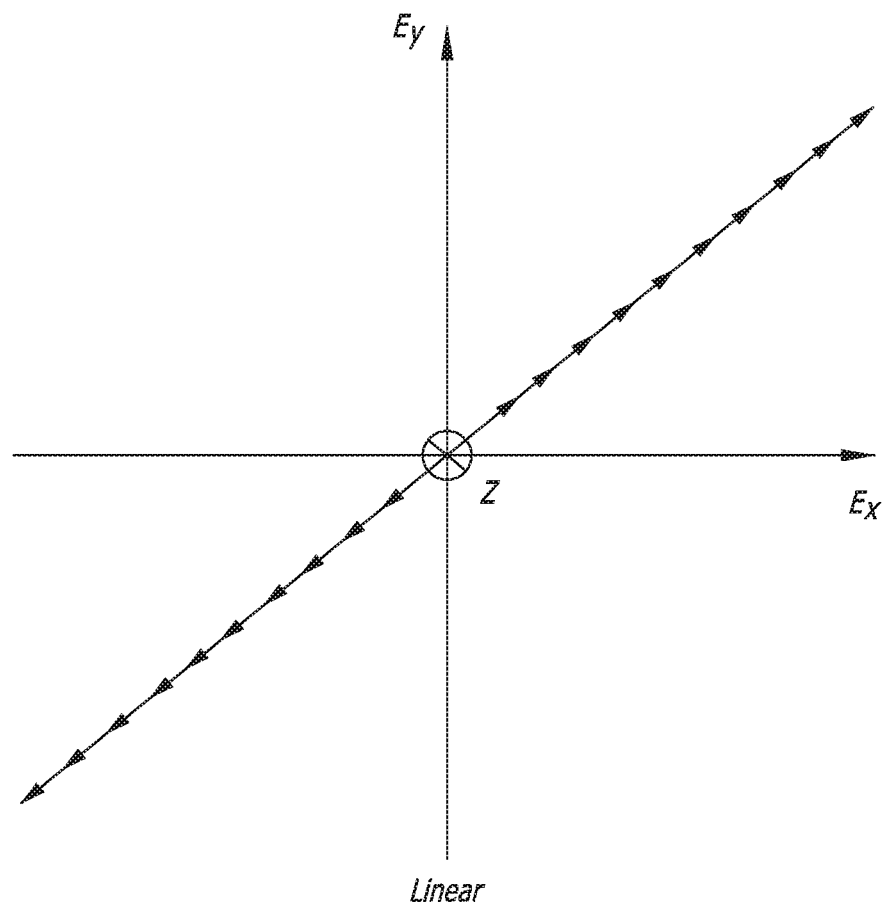
FIG. 1A is a graph showing linear polarized electric fields.

The methods and apparatus disclosed herein provide an operative system for a polarization uniqueness manipulation apparatus (PUMA). In one or more embodiments, the system of the present disclosure teaches an antenna apparatus (e.g., a PUMA) that is configured to passively modify (or manipulate) the polarization of a received signal, and to re-radiate the signal with the modified polarization.

During operation, the disclosed antenna apparatus receives electromagnetic (EM) energy (e.g. a signal) emitted from a source that is configured for a certain polarization orientation (e.g., a first polarization). The antenna apparatus manipulates the polarization such that the EM energy (e.g. the signal) that the antenna apparatus re-radiates back into the environment has a new polarization (e.g., a second polarization) unique from the one it received. The antenna apparatus consists of an antenna for receive (e.g., a receive antenna), an antenna for transmit (e.g., a transmit antenna), and a passive circuit to manipulate the electromagnetic wave's polarization (e.g., the signal's first polarization). The passive circuit comprises the transmit and receive antennas mounted at different orientations and connected together via a feed line. The different orientations of the transmit and receive antennas cause the passive modification of the polarization of the received signal.

As previously mentioned above, radio frequency identification (RFID) systems have been widely deployed in inventory systems, logistics, and retail sales. A typical RFID system utilizes a RFID reader and RFID tags. During operation of an RFID system, the RFID reader transmits a radio frequency (RF) signal to interrogate an RFID tag. After the RFID tag receives the signal, the RFID tag sends a response signal, which is received by the RFID reader. Currently, RFID tags often employ active components to generate the information that is to be delivered to the RFID reader. However, these RFID tags are generally large in size, difficult to fabricate, and expensive.

The disclosed antenna apparatus allows for the transmission of information using a passive device that is much smaller than currently used devices of a similar purpose. The use of the disclosed antenna apparatus allows for a much smaller device footprint that can be placed on tiny objects. The disclosed antenna apparatus is also easy to fabricate, low cost, and does not contain any active components.

In one or more embodiments, the disclosed antenna apparatus may be implemented in a RFID tag of a RFID system. The use of the disclosed antenna apparatus in RFID tags provides a simplified operation with a reduced size than currently employed devices.

In the following description, numerous details are set forth in order to provide a more thorough description of the system. It will be apparent, however, to one skilled in the art, that the disclosed system may be practiced without these specific details. In the other instances, well known features have not been described in detail, so as not to unnecessarily obscure the system.

Embodiments of the present disclosure may be described herein in terms of functional and/or logical components and various processing steps. It should be appreciated that such components may be realized by any number of hardware, software, and/or firmware components configured to perform the specified functions. For example, an embodiment of the present disclosure may employ various integrated circuit components (e.g., memory elements, digital signal processing elements, logic elements, look-up tables, or the like), which may carry out a variety of functions under the control of one or more processors, microprocessors, or other control devices. In addition, those skilled in the art will appreciate that embodiments of the present disclosure may be practiced in conjunction with other components, and that the systems described herein are merely example embodiments of the present disclosure.

For the sake of brevity, conventional techniques and components related to antennas, and other functional aspects of the system (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in one or more embodiments of the present disclosure.

In various embodiments, the disclosed antenna apparatus is employed in a RFID tag of a RFID system. It should be noted that the disclosed antenna apparatus may be used for applications other than RFID systems as disclosed herein. The following discussion is thus directed to RFID systems without loss of generality.

In typical radio frequency (RF) applications, a particular polarization is chosen, and an antenna is selected to couple electromagnetic energy between the RF system and the propagating medium. Once a radiated wave has entered its propagation medium the wave tends to preserve its polarization even off objects that reflect the incident energy. The obvious exception to this is circular polarization flipping its orientation upon reflection off an object, but this behavior is expected and the system is designed accordingly. The disclosed antenna apparatus purposefully manipulates the polarization of a radiated wave after it was emitted into the propagation medium such that some other polarization returns to the RF system after encountering the apparatus.

Figure 1B:
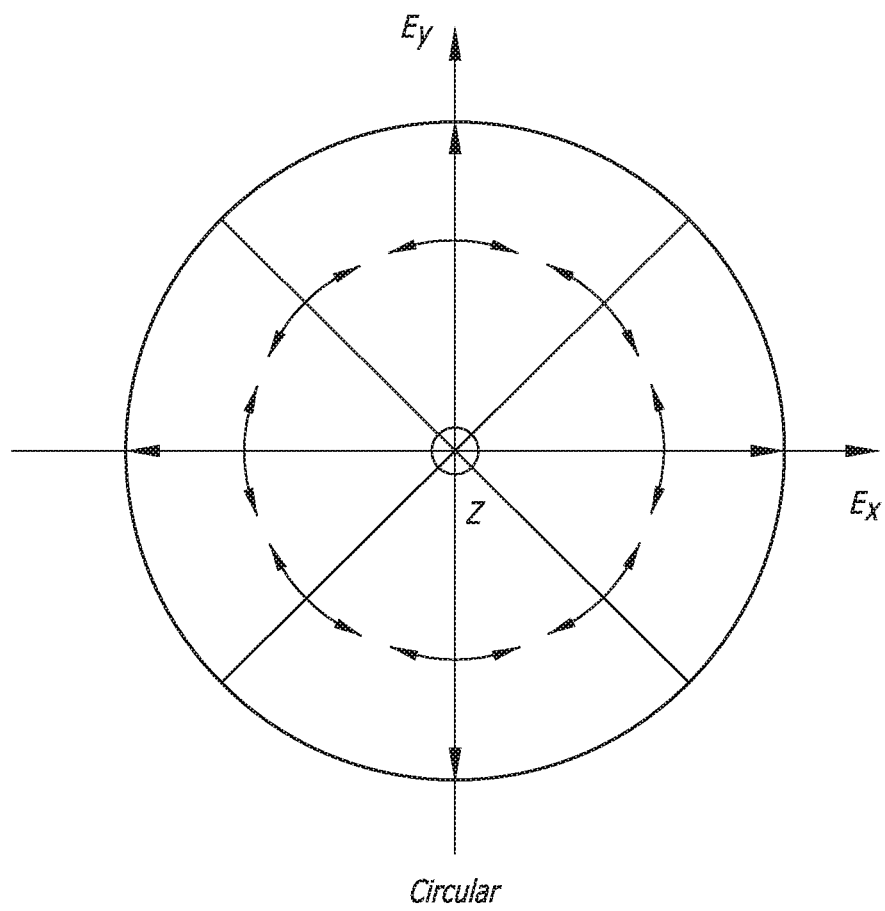
FIG. 1B is a graph showing circular polarized electric fields.
Figure 1C:
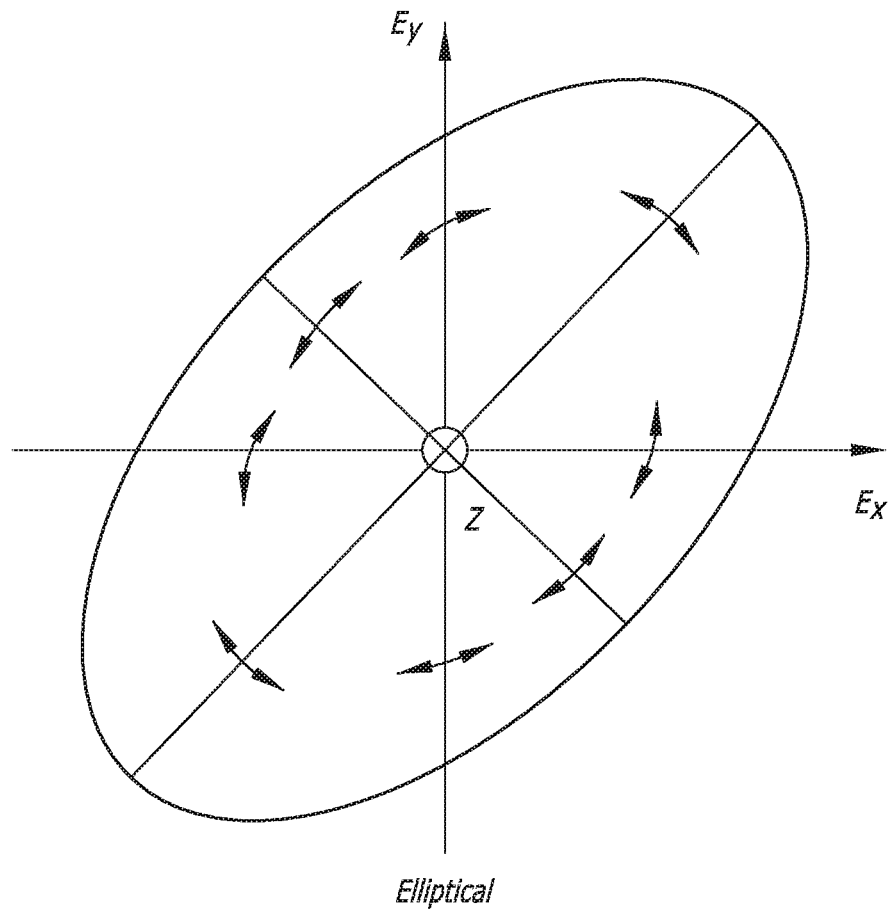
FIG. 1C is a graph showing elliptical polarized electric fields.

FIGS. 1A, 1B, and 1C are graphs showing different exemplary types of polarized electric fields. In particular, FIGS. 1A, 1B, and 1C show graphs showing linear polarized electric fields, circular polarized electric fields, and elliptical polarized electric fields, respectively. According to the Institute of Electrical and Electronics Engineers (IEEE) Standard Definitions for Antennas, the polarization of a radiated wave is defined as "that property of a radiated electromagnetic wave describing the time-varying direction and relative magnitude of the electric field vector; specifically, the figure traced as a function of time by the extremity of the vector at a fixed location in space, and the sense in which it traces, as observed along the direction of propagation." As such, polarization may be typically classified into three categories, which are linear, circular, and elliptical.

The most general category is elliptical, with linear and circular being special cases of elliptical. If the vector (as denoted by the arrows in FIG. 1C) that describes the electric field at a point in space as a function of time traces an ellipse, the field is said to be elliptical. If the vector (as denoted by the arrows in FIG. 1A) that describes the electric field at a point in space as a function of time always points in a line normal to the direction of propagation, then the field is linear. And, if the vector (as denoted by the arrows in FIG. 1B) that describes the electric field at a point in space as a function of time traces out a circle, then the field is circular.

Figure 2A:
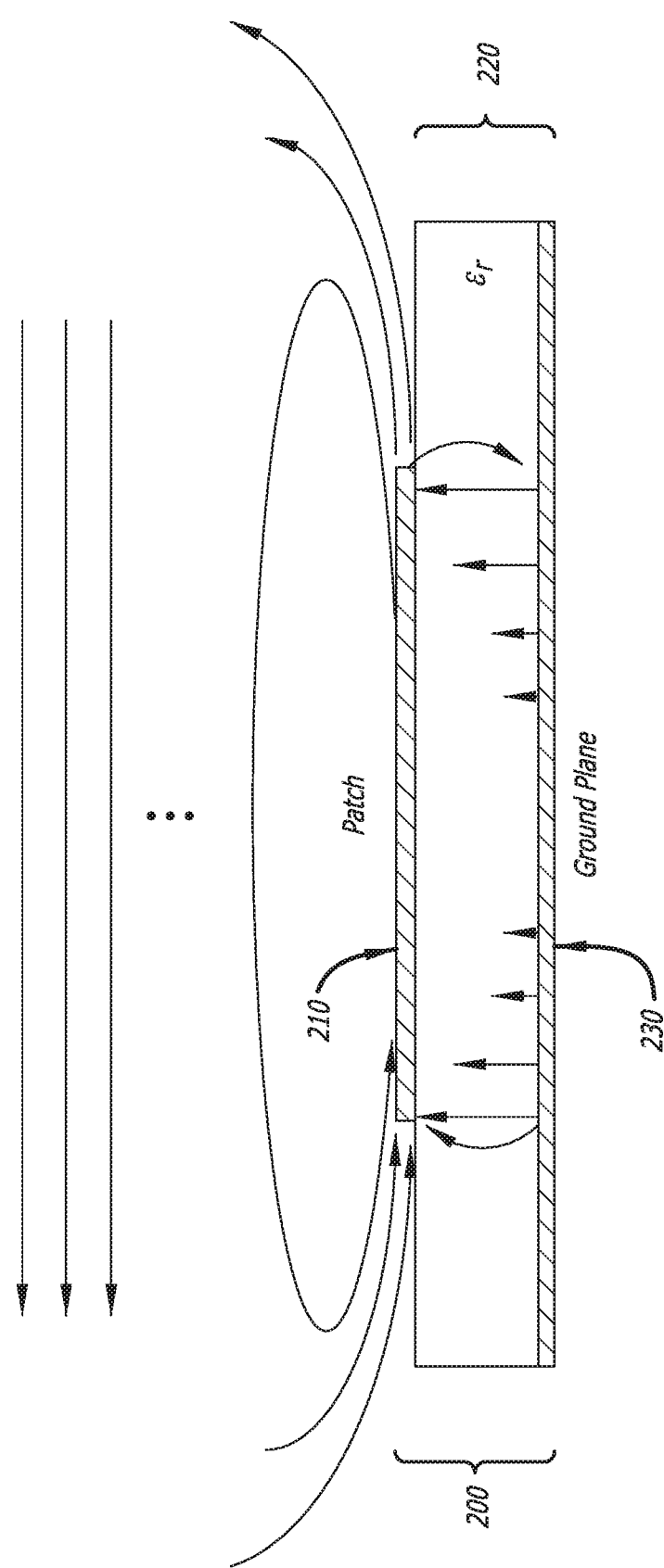

FIGS. 2A and 2B are diagrams showing different views of the disclosed polarization uniqueness manipulation apparatus (PUMA) (antenna apparatus) 200, in accordance with at least one embodiment of the present disclosure. In particular, FIG. 2A is a diagram showing a side view of the disclosed polarization uniqueness manipulation apparatus (PUMA) (antenna apparatus) 200, in accordance with at least one embodiment of the present disclosure. In this figure, the antenna apparatus 200 is shown to comprise a rectangular patch antenna 210 and a substrate 220 with a relative permittivity ($\varepsilon_r$). The patch antenna 210 is mounted to the substrate 220 of the antenna apparatus 200. It should be noted that although FIG. 2A shows the antenna apparatus 200 to only have one patch antenna 210, the disclosed antenna apparatus 200 may comprise two or more patch antennas 210, which may be receive and/or transmit antennas.

During operation, the rectangular patch antenna 210 establishes an electric field (depicted as lines with arrows) in the substrate 220 below the patch antenna 210 and in the space above the patch antenna 210. As the electric field vectors above the patch antenna 210 move into the far field region, they trace out into straight lines, which meets the definition of being linearly polarized.

Also, FIG. 2B is a diagram showing a top view of the patch antenna 210 of the disclosed polarization uniqueness manipulation apparatus (PUMA) (antenna apparatus) 200 of FIG. 2A, in accordance with at least one embodiment of the present disclosure. FIG. 2B shows an exemplary patch antenna 210 design that may be employed by the disclosed antenna apparatus 200. For example, for operation (i.e. for transmitting and/or receiving signals) with frequency around 77 Gigahertz (GHz), the patch antenna 210 design may have the following dimensions: width (w)=0.7 millimeters (mm), length (L)=1.3 mm, $y_o$=0.4 mm, and $w_o$=50 micrometers (μm). And, for example, for operation with a frequency around 10 GHz, the patch antenna 210 design may have the following dimensions: w=1 inch and L=1 inch.

Figure 3:
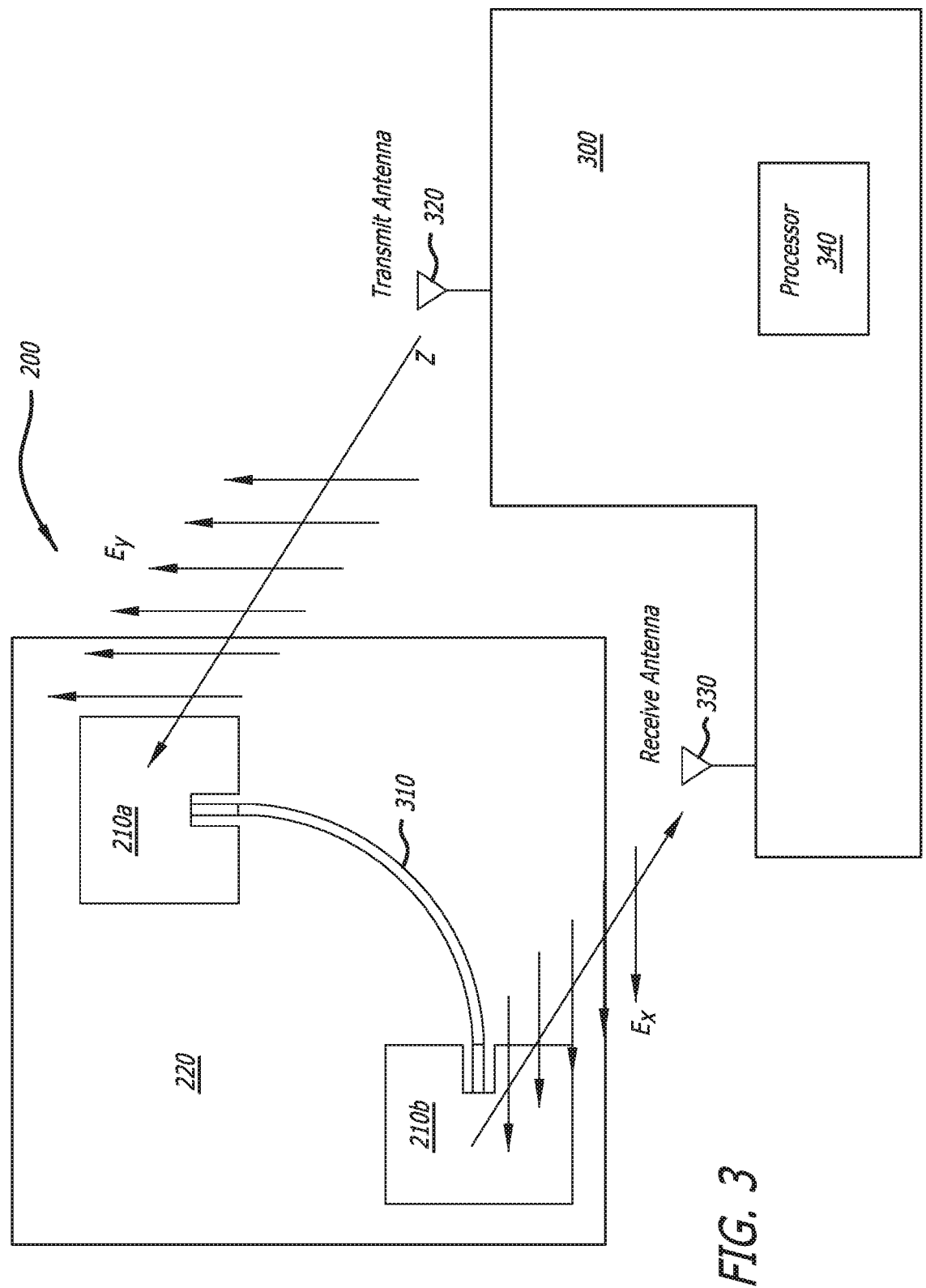
FIG. 3 is a diagram showing a top view of the disclosed polarization uniqueness manipulation apparatus (PUMA), in accordance with at least one embodiment of the present disclosure.

FIG. 3 is a diagram showing a top view of the disclosed polarization uniqueness manipulation apparatus (PUMA) (antenna apparatus) 200, in accordance with at least one embodiment of the present disclosure. In this figure, the antenna apparatus 200 is shown to comprise a transmit antenna 210b, a receive antenna 210a, and a microstrip feed line 310, which is connected the transmit antenna 210b and to the receive antenna 210a. The feed line 310 communicatively couples the transmit antenna 210b to the receive antenna 210a. The transmit antenna 210b, the receive antenna 210a, and the feed line 310 are all mounted on the substrate 220 of the antenna apparatus 200. The transmit antenna 210b and the receive antenna 210a of FIG. 3 both employ the patch antenna 210 design of FIG. 2B.

The antenna apparatus 200 of FIG. 3 is designed such that the receive antenna 210a receives EM energy that is vertically polarized, and the transmit antenna 210b re-radiates the EM energy with a horizontal polarization. The two patch antennas (i.e. the transmit antenna 210b and the receive antenna 210a) are identical to each other in design and size, and are impedance matched by the feed line 310. The two patch antennas (i.e. the transmit antenna 210b and the receive antenna 210a) are mounted to the substrate 220 at different orientations from one another. In particular, in FIG. 3, the two patch antennas (i.e. the transmit antenna 210b and the receive antenna 210a) are mounted to be orthogonal to each other, as is shown. The "z" direction denoted in FIG. 3 is the direction perpendicular to the surface of the antenna apparatus 200, and is also the direction of the electromagnetic (EM) radiation propagation in both the transmit and receive cases.

Also in FIG. 3, a reader apparatus 300 is shown to comprise a transmit antenna 320, a receive antenna 330, and a processor 340. In one or more embodiments, the reader apparatus 300 is a radio frequency identification (RFID) reader, and the antenna apparatus 200 is a RFID tag employed by a RFID system.

During operation of the system (e.g., RFID system), the transmit antenna 320 of the reader apparatus (e.g., a source) (e.g., RFID reader) 300 transmits a signal with a vertical polarization (e.g., a first polarization) towards the antenna apparatus (e.g., RFID tag) 200. In one or more embodiments, the signal is an electromagnetic (EM) signal (e.g., a radio frequency (RF) signal). The receive antenna 210a of the antenna apparatus 200 receives the signal. The received signal then induces a current in the feed line 310 of the antenna apparatus 200. The signal travels from the receive antenna 210a (which is vertically oriented on the substrate 220 in relation to the transmit antenna 210b) to the transmit antenna 210b (which is horizontally oriented on the substrate 220 in relation to the receive antenna 210a) via the feed line 310 in the current. The transmit antenna 210b then re-radiates the signal with a horizontal polarization (e.g., a second polarization), which is orthogonal to the vertical polarization (e.g., the first polarization).

The orientations of the transmit antenna 210b and receive antenna 210a relative to one another on the substrate 220 allow for the antenna apparatus 200 to passively modify the polarization of the signal from a vertical polarization (e.g., a first polarization) to a horizontal polarization (e.g., a second polarization) as the signal travels from the receive antenna 210a to the transmit antenna 210b via the feed line 310. As such, the resultant polarization (e.g., a second polarization) of the signal is dependent upon the orientations of the transmit antenna 210b and receive antenna 210a relative to each other.

It should be noted that in other embodiments, the transmit antenna 210b and receive antenna 210a may be orientated relative to one another on the substrate 220 differently than as depicted in FIG. 3. For example, the receive antenna 210a may be horizontally oriented on the substrate 220 in relation to the transmit antenna 210b, and the transmit antenna 210b may be vertically oriented on the substrate 220 in relation to the receive antenna 210a. In another example, the transmit antenna 210b and receive antenna 210a may be orientated at 45 degree angles from one another (not at 90 degree angles as is shown in FIG. 3). For this example orientation, the resultant polarization (e.g., the second polarization) will not be orthogonal to the initial polarization (e.g., the first polarization) as is the case for FIG. 3, but rather the resultant polarization will be 45 degrees shifted from the initial polarization.

After the transmit antenna 210b re-radiates the signal with a horizontal polarization (e.g., a second polarization), the receive antenna 330 of the reader apparatus (e.g., RFID reader) 300 receives the signal with a horizontal polarization. At least one processor 340 of the reader apparatus 300 determines whether there is a difference between the polarization (e.g., the first polarization) of the transmitted signal and the polarization (e.g., the second polarization) of the received signal. When the processor(s) 340 of the reader apparatus 300 determines that the polarization (e.g., the first polarization) of the transmitted signal and the polarization (e.g., the second polarization) of the received signal are different, the processor(s) 340 then processes the received signal to indicate that an antenna apparatus (e.g., RFID tag) 200 was indeed detected by the apparatus reader (e.g., RFID reader) 300. In other words, since the polarization (e.g., the second polarization) of the received signal is different than the polarization (e.g., the first polarization) of the transmitted signal as it is expected to be to indicate the presence of an antenna apparatus (e.g., RFID tag) 200, the processor(s) 340 of the reader apparatus (e.g., RFID reader) 300 determines that an antenna apparatus (e.g., RFID tag) 200 is detected.

Figure 4:
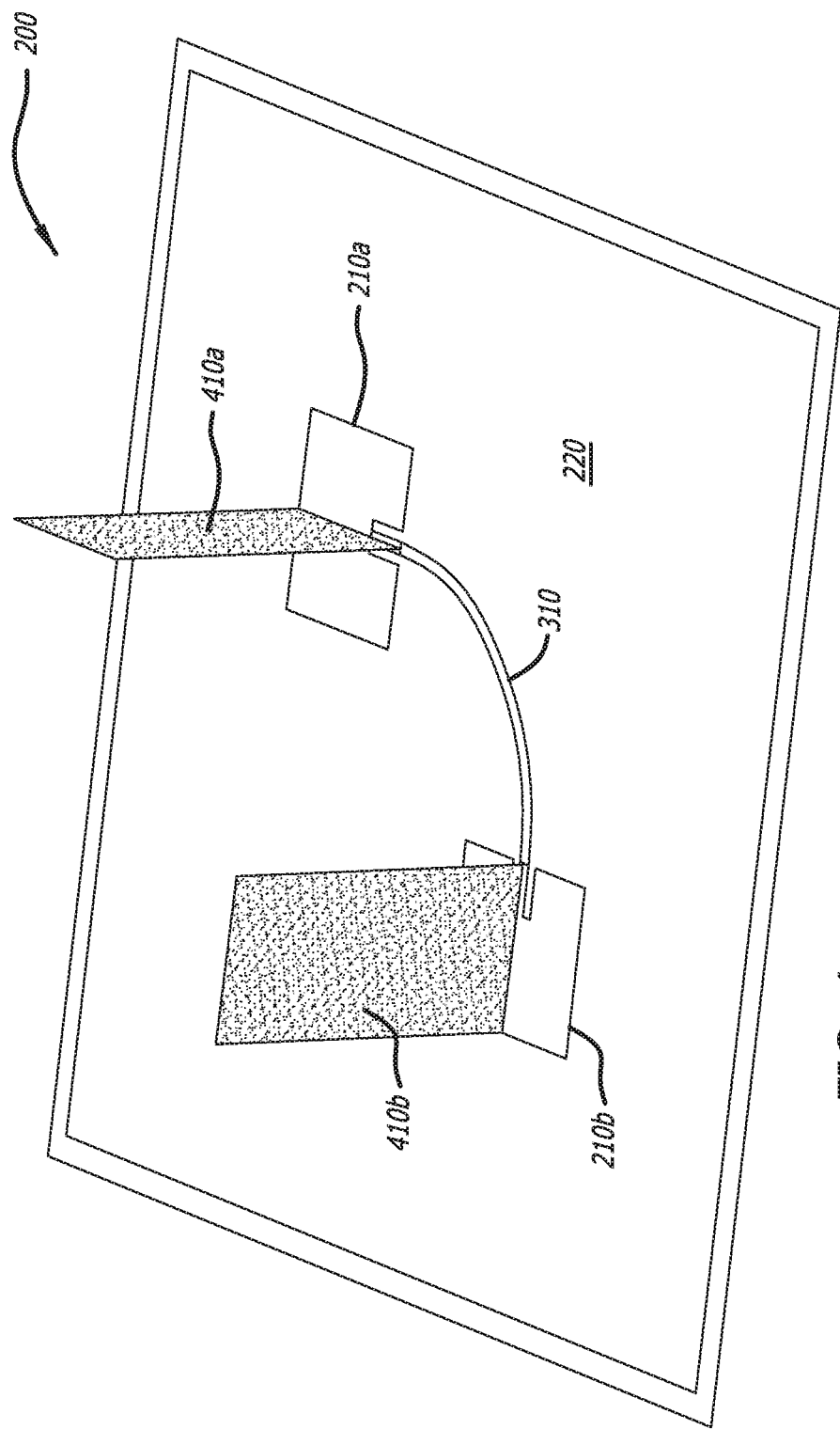
FIG. 4 is a diagram showing a top view of the disclosed polarization uniqueness manipulation apparatus (PUMA) depicting the received and transmitted electromagnetic (EM) energy, in accordance with at least one embodiment of the present disclosure.

FIG. 4 is a diagram showing a top view of the disclosed polarization uniqueness manipulation apparatus (PUMA) (antenna apparatus) 200 depicting the received electromagnetic (EM) energy 410a and transmitted EM energy 410b, in accordance with at least one embodiment of the present disclosure. In this figure, a vertically polarized plane wave of received EM energy 410a is shown to be incident on the receive antenna 210a of the antenna apparatus 200 (i.e. 410a shows the plane containing the dominate EM field for the receive antenna 210a). The received EM energy 410a coupled on the receive antenna 210a induces a current that travels via the feed line 310 from the receive antenna 210a to the transmit antenna 210b. At the transmit antenna 210b, a horizontally polarized plane wave of transmit EM energy 410b is shown to be radiated with a horizontal polarization (i.e. 410b shows the plane containing the dominate EM field for the transmit antenna 210b).

Figure 5:
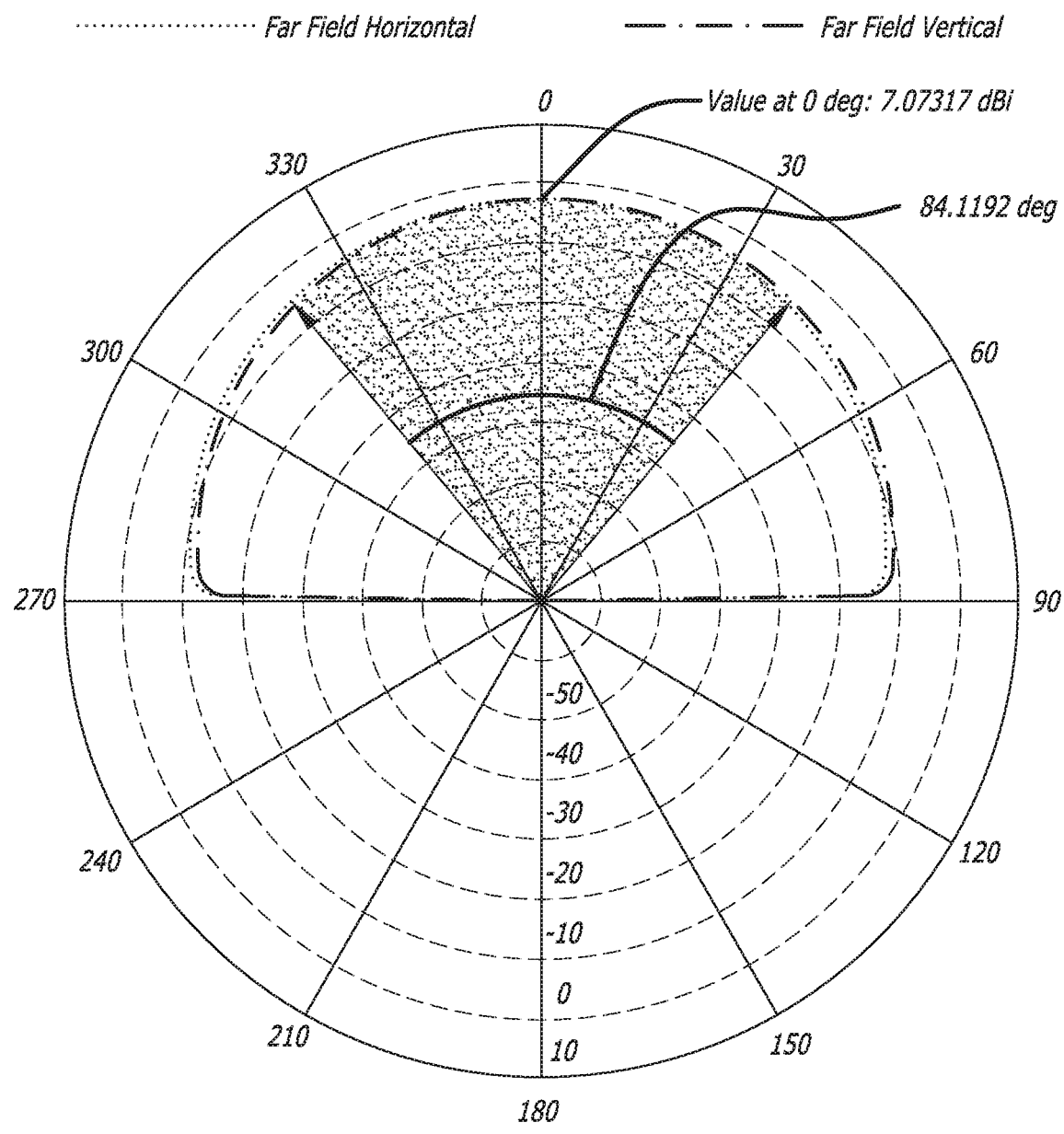
FIG. 5 is a graph showing the far field gain pattern for an exemplary polarization uniqueness manipulation apparatus (PUMA), in accordance with at least one embodiment of the present disclosure.

FIG. 5 is a graph 500 showing the far field gain pattern for an exemplary polarization uniqueness manipulation apparatus (PUMA) (antenna apparatus) 200, in accordance with at least one embodiment of the present disclosure. In particular, this figure shows the far field gain pattern for the patch antenna 210 of FIG. 2B transmitting at 77 GHz with the associated dimensions given for the patch antenna 210 design of FIG. 2B. The graph 500 shows that at zero (0) degrees, the directivity of the patch antenna 210 is equal to 7.07317 decibels relative to isotropic (dBi). The shaded cone (of 84.1192 degrees) on the graph 500 indicates the 3 decibels (dB) beamwidth of the far field gain pattern.

Figure 6:
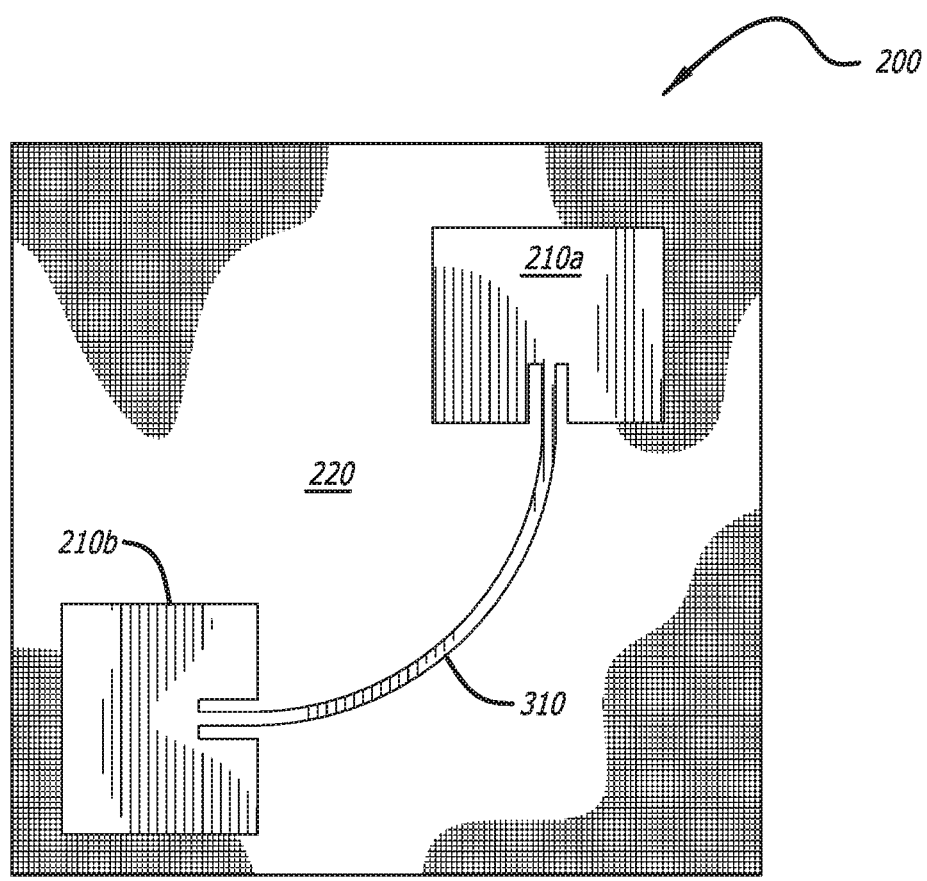
FIG. 6 is a diagram showing another top view of the disclosed polarization uniqueness manipulation apparatus (PUMA), in accordance with at least one embodiment of the present disclosure.

FIG. 6 is a diagram showing another top view of the disclosed polarization uniqueness manipulation apparatus (PUMA) (antenna apparatus) 200, in accordance with at least one embodiment of the present disclosure. In this figure, the transmit antenna 210a, the receive antenna 210b, and the feed line 310 are depicted to be manufactured from the same material. Various different types of conductive materials may be employed for the transmit antenna 210a, the receive antenna 210b, and the feed line 310 including, but not limited to, various metals (such as copper, silver, gold, and/or tin) and conductive inks. The substrate 220 of the disclosed antenna apparatus 200 may be manufactured from various different types of insulating materials including, but not limited to RT/duriod by Rogers Corporation, FR-4 (i.e. a National Electrical Manufacturers Association (NEMA) grade for a glass-reinforced epoxy laminate material that is flame resistant), Pyralux by DuPont, and Kapton by DuPont.

Figure 7:
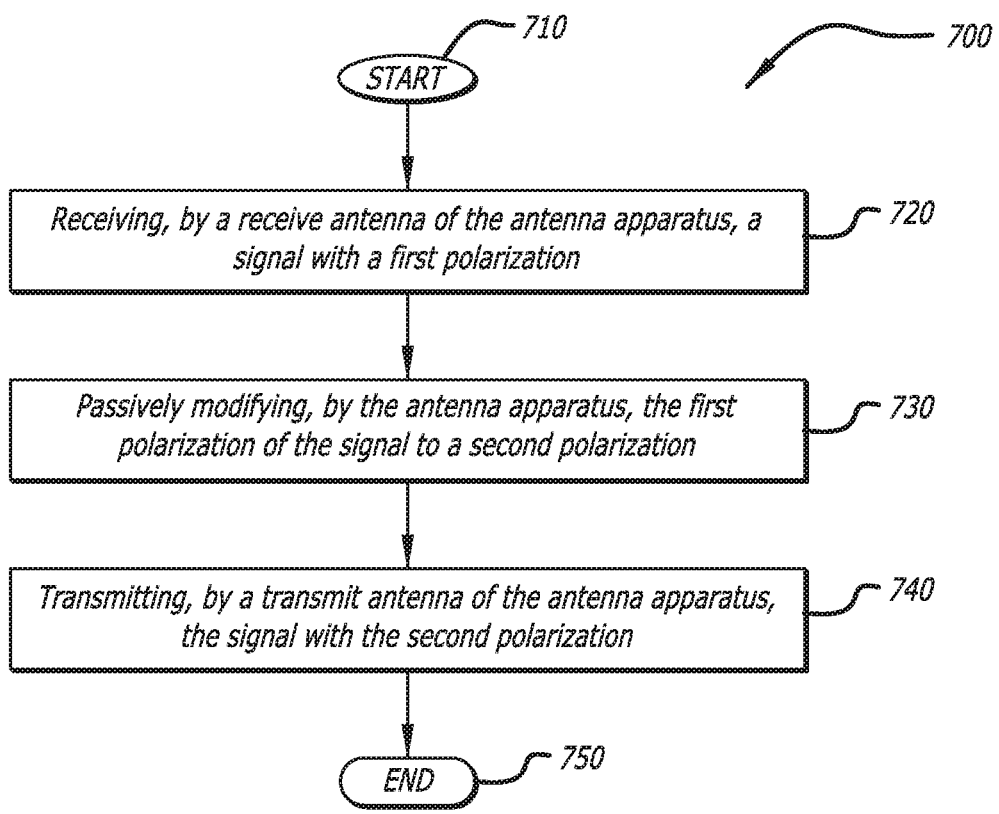
FIG. 7 is a flow chart showing a method for operating the disclosed polarization uniqueness manipulation apparatus (PUMA), in accordance with at least one embodiment of the present disclosure.

FIG. 7 is a flow chart showing a method 700 for operating the disclosed polarization uniqueness manipulation apparatus (PUMA) (antenna apparatus) (e.g., RFID tag) 200, in accordance with at least one embodiment of the present disclosure. At the start 710 of the method 700, a receive antenna of the antenna apparatus receives a signal with a first polarization 720. Then, the antenna apparatus passively modifies the first polarization of the signal to a second polarization 730. A transmit antenna of the antenna apparatus then transmits the signal with the second polarization 740. Then, the method 700 ends 750.

Figure 8:
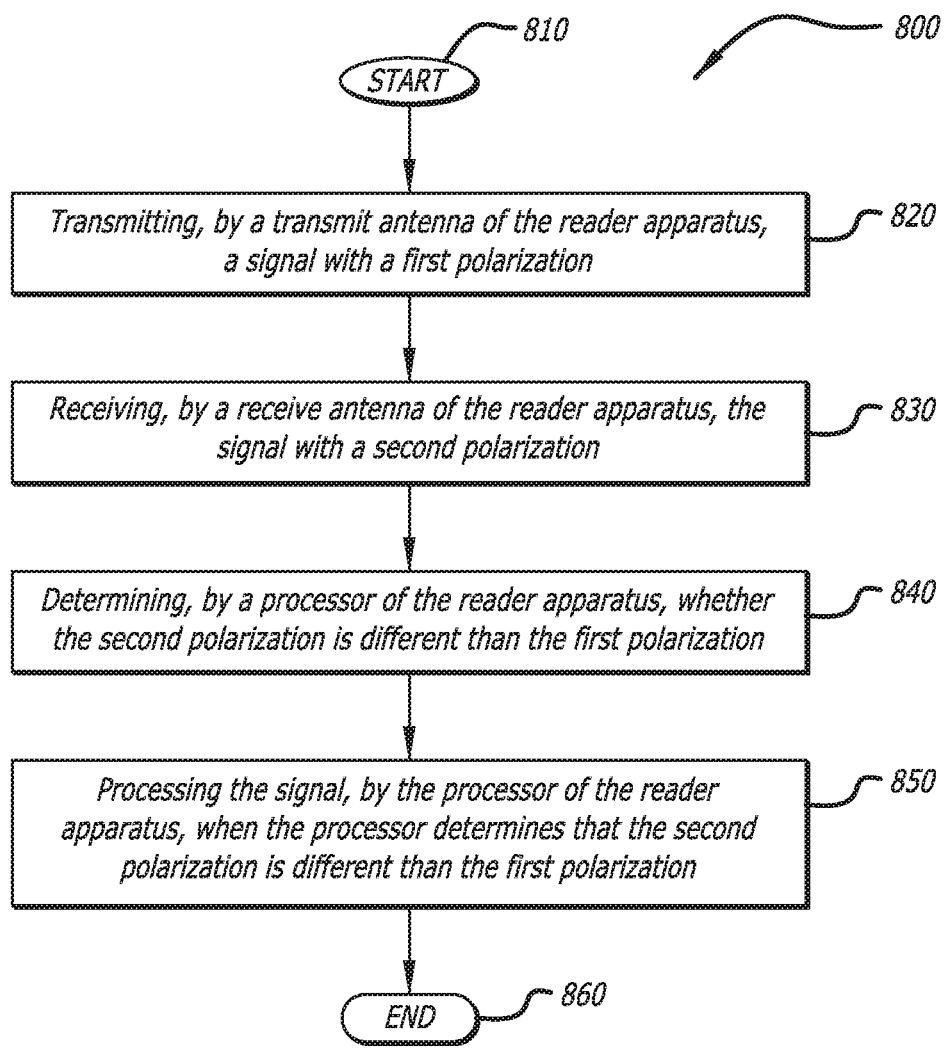
FIG. 8 is a flow chart showing a method of operating a disclosed reader apparatus, in accordance with at least one embodiment of the present disclosure.

FIG. 8 is a flow chart showing a method 800 of operating a disclosed reader apparatus (e.g., RFID reader), in accordance with at least one embodiment of the present disclosure. At the start 810 of the method 800, a transmit antenna of the reader apparatus transmits a signal with a first polarization 820. Then, a receive antenna of the reader apparatus receives the signal with a second polarization 830. A processor of the reader apparatus then determines whether the second polarization is different than the first polarization 840. Then, the processor of the reader apparatus processes the signal, when the processor determines that the second polarization is different than the first polarization 850. Then, the method 800 ends 860.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

Where methods described above indicate certain events occurring in certain order, those of ordinary skill in the art having the benefit of this disclosure would recognize that the ordering may be modified and that such modifications are in accordance with the variations of the present disclosure. Additionally, parts of methods may be performed concurrently in a parallel process when possible, as well as performed sequentially. In addition, more steps or less steps of the methods may be performed.

Accordingly, embodiments are intended to exemplify alternatives, modifications, and equivalents that may fall within the scope of the claims.

Although certain illustrative embodiments and methods have been disclosed herein, it can be apparent from the foregoing disclosure to those skilled in the art that variations and modifications of such embodiments and methods can be made without departing from the true spirit and scope of this disclosure. Many other examples exist, each differing from others in matters of detail only. Accordingly, it is intended that this disclosure be limited only to the extent required by the appended claims and the rules and principles of applicable law.

We claim:

1. An antenna apparatus, the apparatus comprising:
   a receive antenna configured to receive a signal with a first polarization, wherein the antenna apparatus is configured to passively modify the first polarization of the signal to a second polarization, which is different than the first polarization; and
   a transmit antenna configured to transmit the signal with the second polarization, wherein the receive antenna is communicatively coupled to the transmit antenna, and
   wherein the receive antenna and the transmit antenna are mounted at different orientations from one another, and the second polarization is dependent upon the different orientations.

2. The apparatus of claim 1, wherein the signal is an electromagnetic signal.

3. The apparatus of claim 2, wherein the signal is a radio frequency (RF) signal.

4. The apparatus of claim 1, wherein the receive antenna and the transmit antenna are each separate patch antennas.

5. The apparatus of claim 4, wherein the apparatus further comprises a substrate, and wherein the patch antennas are mounted on the substrate at the different orientations from one another.

6. The apparatus of claim 4, wherein the patch antennas are impedance matched.

7. The apparatus of claim 1, wherein the first polarization is orthogonal to the second polarization.

8. The apparatus of claim 1, wherein one of the first polarization or the second polarization is horizontal polarization, and wherein another of the first polarization or the second polarization is vertical polarization.

9. The apparatus of claim 1, wherein the antenna apparatus is a radio frequency identification (RFID) tag.

10. A method for operating an antenna apparatus, the method comprising:
   receiving, by a receive antenna of the antenna apparatus, a signal with a first polarization;
   passively modifying, by the antenna apparatus, the first polarization of the signal to a second polarization, which is different than the first polarization; and
   transmitting, by a transmit antenna of the antenna apparatus, the signal with the second polarization, wherein the receive antenna is communicatively coupled to the transmit antenna, and
   wherein the receive antenna and the transmit antenna are mounted at different orientations from one another, and the second polarization is dependent upon the different orientations.

11. The method of claim 10, wherein the signal is an electromagnetic signal.

12. The method of claim 11, wherein the signal is a radio frequency (RF) signal.

13. The method of claim 10, wherein the receive antenna and the transmit antenna are each separate patch antennas.

14. The method of claim 13, wherein the patch antennas are mounted on a substrate of the antenna apparatus at the different orientations from one another.

15. The method of claim 13, wherein the patch antennas are impedance matched.

16. The method of claim 10, wherein the first polarization is orthogonal to the second polarization.

17. The method of claim 10, wherein one of the first polarization or the second polarization is horizontal polarization, and wherein another of the first polarization or the second polarization is vertical polarization.

18. The method of claim 10, wherein the antenna apparatus is a radio frequency identification (RFID) tag.

19. A reader apparatus, the apparatus comprising:
   a transmit antenna configured to transmit a transmit signal with a first polarization;
   a receive antenna configured to receive a receive signal with a second polarization; and
   a processor configured to determine whether the second polarization of the receive signal is different than the first polarization of the transmit signal, and to process the receive signal, when the processor determines that the second polarization of the receive signal is different than the first polarization of the transmit signal.

20. The apparatus of claim 19, wherein the apparatus is a radio frequency identification (RFID) reader.

* * * * *